United States Patent [19]

Schreiber et al.

[11] B 3,996,175

[45] Dec. 7, 1976

[54] STORAGE-STABLE, QUICK-CURING EPOXIDE RESIN MOULDING MATERIALS

[75] Inventors: Bruno Schreiber, Basel; Wolfgang Seiz, Pfeffingen; Ewald Forster, Allschwil, all of Switzerland

[73] Assignee: Ciba-Geigy Corporation, Ardsley, N.Y.

[22] Filed: July 17, 1974

[21] Appl. No.: 489,331

[44] Published under the second Trial Voluntary Protest Program on February 17, 1976 as document No. B 489,331.

Related U.S. Application Data

[63] Continuation of Ser. No. 257,799, May 30, 1972, abandoned.

[30] Foreign Application Priority Data

June 25, 1971 Switzerland ............... 9351/71

[52] U.S. Cl. .................. 260/28 P; 260/37 EP
[51] Int. Cl.$^2$ ........................... C08L 91/00
[58] Field of Search ......... 260/37 EP, 47 EN, 2 N, 260/28

[56] References Cited

UNITED STATES PATENTS 3,288,747  11/1966  Sussman ............... 260/37 EP
3,409,591  11/1968  Landua et al. ........ 260/47 EN
3,454,421  7/1969  Westbrook ........... 260/47 EN X
3,533,985  10/1970  Lantz et al. .......... 260/37 EP

OTHER PUBLICATIONS

Lee et al.; Handbook of Epoxy Resins; McGraw–Hill Book Co.; 1967; pp. 8–15.

*Primary Examiner*—Lewis T. Jacobs
*Attorney, Agent, or Firm*—Vincent J. Cavalieri

[57] ABSTRACT

The invention relates to storage-stable, quick-curing epoxide resin moulding materials containing:
a. epoxide resins,
b. pre-adducts containing free amino groups and formed from polyamines containing aromatic groups and low-molecular epoxide resins, as curing agents, and
c. mineral or organic pulverulent or fibrous fillers, with the epoxide resins and the curing agents softening between 45° and 120° C, and having a melting point higher by 5° to 30° C than the softening point, and being present in the said moulding materials predominantly in the form of particles separated from each other. The moulded articles have good mechanical and dielectric properties.

14 Claims, No Drawings

STORAGE-STABLE, QUICK-CURING EPOXIDE RESIN MOULDING MATERIALS

This is a continuation of application Ser. No. 257,799 filed on May 30, 1972, and now abandoned.

The invention relates to storage-stable, quick-curing epoxide resin moulding materials which contain solid epoxide resins, amine curing agent - pre-adducts containing solid aromatic constituents, optionally lubricants, and also fillers.

Moulding materials from epoxide resins based on bisphenol-A or on other bis- or polyphenols and epichlorohydrin, which contain aromatic amines as curing agents, are distinguished by easy mouldability and good mechanical properties; there is therefore a large field of application for these moulding materials. This applies, in particular, to the materials produced according to the British Patent 871,350 by a process in which the stoichiometric amount of aromatic amine is added to the epoxide resin, and the mixture, together with mineral fillers, lubricants, etc., preliminarily reacted to the B-stage. A disadvantage of these materials is, however, that their stability in storage is frequently not fully adequate to satisfy practical requirements: if a constant flowing property is to be guaranteed, they have to be stored in cold-storage rooms and, in some cases, conveyed in cold-storage transporters. The storage stability is further worsened where attempts are made to achieve, by suitable additions, particularly short moulding times.

In addition to these processes, production processes are known in which the amine curing agent is introduced into the moulding materials in such a manner that it is separated from the resin during storage, and can not become active until the moulding material is melted in the moulding tool. The simplest process is the one known as the Dry-Blend-Process wherein a solid epoxide resin, e.g. an epoxide- novolak, is employed in combination with a crystalline low-molecular curing agent, e.g. with m-phenylenediamine. The disadvantage of this process is that the low-molecular curing agent in the moulding material has a low viscosity in the molten state. The consequence of this is that, after melting in the moulding tool, a proportion of the curing agent does not react as intended with the resin, but finds its way to the surface of the moulded component, giving rise there to exudations which, toxicologically, can give cause for concern. Furthermore, with the use of, e.g. m-phenylenediamine or diaminodiphenylmethane — even in the case of moulding materials produced by the Dry-Blend-Process — the storage stability is unsatisfactory where it is necessary, for the attainment of particularly short moulding times, to accelerate the curing process. The mentioned disadvantages cannot be completely overcome either by, e.g. the curing agent component being bound to a molecular sieve (British Patent 914,003), or applied to the surface of a filler (British Patent 1,009,478). Surprisingly, the new moulding materials according to the invention do not have these disadvantages. The new storage-stable, quick-curing epoxide resin moulding materials are characterised in that they contain:

a. epoxide resins,
b. pre-adducts containing free amino groups and formed from polyamines containing aromatic groups and low-molecular epoxide resins, as curing agents, and
c. mineral or organic pulverulent or fibrous fillers, with the epoxide resins and the curing agents softening between 45° and 120°C, preferably between 50° and 90°C, and melting 5° to 30°C above the softening point, and being present in the moulding materials predominantly in the form of particles separated from each other.

Preferably, the moulding materials also contain lubricants.

The new moulding materials are produced according to the invention by a process in which a polyamine containing an aromatic group is reacted with an epoxide resin, the respective amounts being such that the ratio of the number of the reactive hydrogen atoms of the polyamine on the amine nitrogen atoms to that of the epoxide groups of the epoxide resin is in the range of 3 : 1 to 5 : 1, advantageously between 3.5 : 1 and 4.5 : 1; the formed curing agent pre-adduct, which has a softening point in the range of 45° to 120°C and a melting point 5°– 30°C higher than this, is then mixed and ground with an epoxide resin softening between 45° and 120°C and having a melting point higher by 5° – 30°C than the softening point, also with a filler and, optionally, with a lubricant, whereby there occurs to a slight degree at the most a fusing together of the particles of the resin and of the curing agent.

Suitable epoxide resins are: epoxidised phenol or cresol novolaks, epoxidised phenolphthalein, diglycidylterephthalate, glycidylated symmetrical tetra-(p-hydroxyphenyl)-ethane, etc..

It is preferable to use, as epoxide resin, solid pre-adducts which are produced from a low-molecular, solid or liquid epoxide resin and less than equivalent amount of a polyamine, preferably aromatic diamine.

The epoxide resin and the curing agent are mixed, preferably in an approximately stoichiometric ratio, together with fillers and lubricants in such a manner that a homogeneous mixing of the individual particles is obtained with, however, careful avoidance of anything more than a superficial fusing together of the solid particles of the resin and of the curing agent. The thus obtained moulding powder can then be employed as it is, or it can be granulated.

The procedure in detail can be as follows:

As epoxide resin, solid pre-adducts are used which are formed from:

a. a liquid epoxide resin based on bisphenol A having an epoxide content of at least 4.5 equiv./kg, or on other low-molecular aromatic diglycidyl compounds such as, e.g. resorcin-diglycidyl ether, phenolphthaleindiglycidyl ether, halogen-containing diglycidyl compounds, etc., and
b. an amount less than the equivalent amount of an aromatic or, optionally, of a cycloaliphatic diamine such as, e.g. diaminodiphenylmethane, diaminodiphenylsulphone, diaminodiphenyl ketone, m-phenylenediamine, or diaminodimethyl-dicyclohexylmethane.

The formation of the adduct conforms approximately to the following reaction pattern, the weighed amounts of the reactants being such that the obtained adduct after cooling is resinous, brittle and no longer sticky. With an $NH_2$/epoxy ratio of 0.18 to 0.2, adducts are obtained which are particularly suitable for the intended purpose:

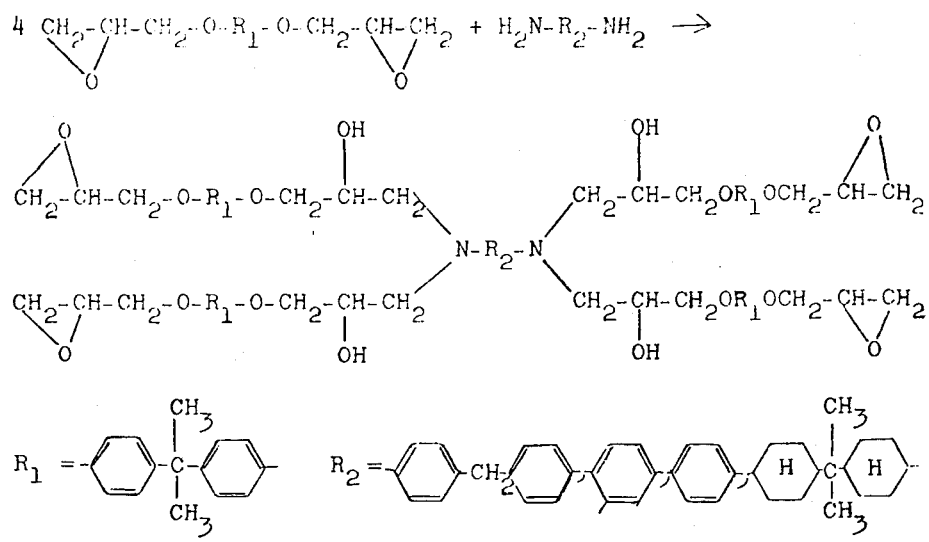

The procedure adopted can be as follows:

The epoxide resin or, optionally, epoxide resin mixture which has been weighed out into the reaction vessel is heated in an oil bath to 100° – 180°C (depending on reactivity); then, with continuous stirring, an addition is made within 30 – 60 minutes, portionwise or continuously, of the amine amount necessary for the formation of the adduct, the addition being effected in such a manner that the reaction remains throughout controllable, and the temperature in the reaction vessel does not exceed a value of 200°C. A liquid viscous at the reaction temperature is obtained; this liquid is then poured into a flat vessel and, after cooling, solidifies to form a solid, easy crushable resin. The preliminary chain-lengthening reaction can also be performed continuously in a reaction vessel heated to 200°C.

The resin adducts can be combined in moulding materials with each other, or with other epoxide compounds solid at room temperature, and modified to obtain a desired modification of properties in the products; it is possible, for example, to increase the dimensional stability under heat by the addition of triglycidylisocyanurate, epoxidised phenol or cresol novolaks, epoxidised phenolphthalein, prelenghterred derivatives, and other suitable polyglycidyl compounds; or to achieve a flexibilisation by the addition of solid high-molecular bisphenol-A epoxide resins, or polyesters suitable for the purpose.

Suitable curing agents are solid pre-adducts from
a. aromatic diamines such as diaminodiphenylmethane, diaminodiphenylketone, diaminoditolylmethane, diaminodiphenylsulphone, o-, m-, p-phenylenediamine, diaminodiphenyl ether, benzidine, diaminostilbene, 4,4′-diamino-3,3′-dimethylbiphenyl, etc., and
b. an amount lower than the equivalent amount of a diepoxide compound, such as, e.g. a liquid low-molecular resin based on bisphenol A/epichlorohydrin having an epoxide content of more than 4.5 equiv./kg, diglycidyl ethers of other bivalent phenols, diglycidyl esters of aromatic, cycloaliphatic or, optionally, heterocyclic dicarboxylic acids, such as, e.g. diglycidylterephthalate, diglycidylhexahydrophthalate, or N,N-diglycidyl compounds such as N,N-diglycidylcyclohexylamine or diglycidyldimethylhydantoin, halogen-containing epoxide resins, e.g. from brominated bisphenol-A, etc..

The production of the curing agent component from amine with less than the equivalent amount of epoxide resin is effected, preferably in the absence of solvents, in the reaction vessel at temperatures, in general, of between 50° and 200°C, preferably between 120° and 170°C, the procedure being that the amino compound is placed into the vessel and the epoxide compound mixed in portionwise or continuously; or, alternatively, it is effected by a process in which the two basic constituents are mixed continuously in a suitable reactor heated to 200°C and caused to react. The preliminary chain-lengthening reaction occurs, under these conditions, practically quantitatively, and yields highly storage-stable intermediates.

The preliminary chain-lengthening reaction follows approximately the following reaction sequence:

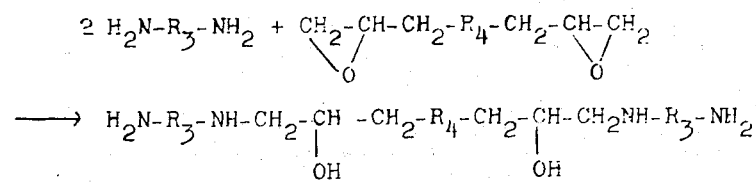

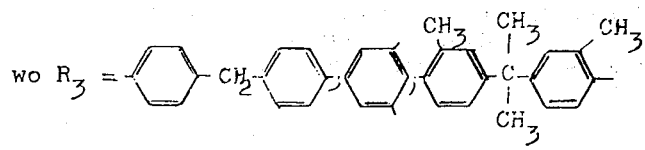

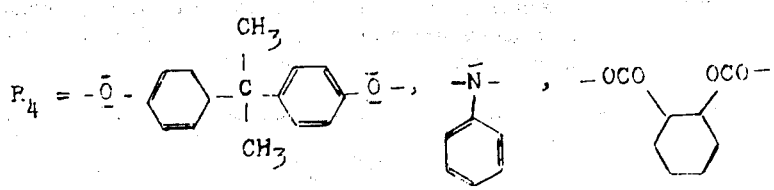

The ratio between amino and epoxide groups in the mixture is in the range of 1.5 – 2.5, usually between 1.75 – 2.25, and accordingly leads to products with differing softening points.

The softening points (measured on the Koflerbank) of the epoxide resins and of the amine curing agent pre-adducts are between 45° and 120°C, preferably between 50° and 90°C, and the melting points thereof in the region of 55° to 150°C. In the case of each of these components, there must be a temperature difference of 5° – 30°C between softening and melting points.

The following may be used as fillers: quartz flour, ground shale, calcined kaolin, powdered chalk, wollastonite, mica, aluminium oxide trihydrate, diopside, ground dolomite, talcum, barium sulphate, graphite, wood flour, pigments, etc., also such materials which simultaneously serve as toughening agents, such as asbestos, glass, carbon and boron fibre, organic fibres, e.g. cellulose, polyamide, polyester, polyacrylonitrile, etc.. It is also possible to use mixtures of such fillers. Suitable lubricants are, e.g. stearates such as magnesium, calcium and zinc stearate, stearic acid, bees wax, carnauba wax, paraffin and synthetic waxes, e.g. based on polyethylene or on silicone.

The moulding materials can be produced as follows:

The adduct produced with an excess of epoxide resin and with cycloaliphatic and aromatic amines is mixed, with the addition of inorganic or organic fillers, lubricants and, optionally, accelerators, with the aid of a ball mill, which may be optionally cooled, or of similar equipment, which render possible a crushing and thorough mixing of the constituents of the moulding materials, without more than a superficial fusing together of the particles of the resin and of the curing agent occurring in the said crushing and mixing operation. The resin and the curing agent are therefore present in the finished moulding material predominantly in the form of separate particles; blending together and reaction occur firstly on melting under the action of heat and pressure in the press or screw injection moulding machine used for processing. The obtained fine pulverulent product is employed as it is, or it is firstly granulated before being further processed by the most diverse standard processes (by moulding, injection moulding, transfer moulding, etc.). The moulding materials produced by the process according to the invention offer, e.g. compared with a B-stage material of identical composition, the following advantages:

- a storage stability at least 10 times as great; storage and transport in cold-storage containers can consequently be dispensed with in many cases;
- a clearly higher rate of curing, which permits a shorter moulding times, thus rendering processing more economic;
- a better and more accurately controllable flow property, a factor contributing towards a reduction in the level of rejects in processing;
- greater homogeneity and superior surface finish of the moulded components obtained.

The mechanical and dielectrical properties of the moulded articles are, moreover, at least as good as those of moulded components produced from a B-stage material of the same composition. The above mentioned advantages are retained also in the case where the new process is used to produce moulding materials which, compared with B-stage materals, have a somewhat increased proportion of fillers.

PRODUCTION OF RESIN ADDUCTS

Adduct I

An amount of 1000 g of a liquid bisphenol-A epoxide resin having a content of 5.35 epoxide group equivalents/kg and a viscosity at 25°C of 13,500 cP is placed into a 2-liter reaction vessel, and heated in an oil bath to 140°C. In the course of 45 minutes, an amount of 100 g of 4,4'-diaminodiphenylmethane (10.00 NH$_2$/kg) is mixed in at 100°C in the molten state. The rate of addition is so regulated that the temperature of the reaction mixture does not exceed 170°C. After a further 30 minutes at the same temperature, the obtained viscous liquid is cooled, and the light-yellow, resinous and brittle product ground.

Properties of the product:
| | |
|---|---|
| epoxide group equivalents/kg | = 3.00, |
| softening point (accord. to Kofler) | = 58°C, |
| melting point (accord. to Kofler) | = 72°C. |

Adduct II

An amount of 1000 g of the same epoxide resin as used for Adduct I is heated to 170°C, and, at this temperature, 120 g of 4,4'-diaminodiphenylsulphone (NH$_2$/kg = 8.00) added in portions in the course of 1 hour, and mixed in. By control of heating and the rate of the amine addition, the temperature of the mixture is so regulated that it does not exceed 185°C. The viscous liquid is afterwards maintained for 30 minutes at 170°C, and the reaction then terminated. The resin is thereupon cooled, and ground in a mill.

Properties:
| | |
|---|---|
| softening point | = 55°C, |
| melting point | = 74°C, |
| epoxide group equiv./kg | = 2.95. |

Adduct III

An amount of 1000 g of the same epoxide resin as used for Adduct I is placed into a 2-liter reaction vessel and heated to 115°C. In the course of 40 minutes and with continuous stirring, an amount of 115 g of 4,4'-diamino-3,3'-dimethyldicyclohexylmethane (8.4 NH$_2$/kg) is added dropwise at such a rate that the temperature of the mixture does not exceed 140°C. After a further 10 minutes at this temperature, the product is cooled and ground.

Properties:

| | |
|---|---|
| epoxide group equivalents/kg | = 3.06, |
| softening point | = 58°C, |
| melting point | = 73°C. |

Adduct IV

An amount of 500 g of the same epoxide resin as used for Adduct I is placed into a 1-liter reaction vessel, and heated in an oil bath to 80°C. An amount of 50 g of melted 4,4′-diaminodiphenylmethane at 90°C is then mixed in all at once, and the temperature of the bath raised during 2 hours to 140°C, the bath being held at this temperature for a further 30 minutes. The obtained viscous product is cooled and finally ground.

Properties:

| | |
|---|---|
| epoxide group equivalents/kg | = 2.95, |
| softening point | = 60°C, |
| melting point | = 76°C. |

Adduct V

An amount of 500 g of an epoxidised phenolphthalein (epoxide equiv./kg = 4.15; softening point = 53°C) is melted in a 1-liter reaction vessel and heated to 140°C. In the course of 60 minutes and with continuous stirring, an amount of 20 g of 4,4′-diaminodiphenylmethane (10.00 amino group equiv./kg) is added dropwise in the molten condition at such a rate that the temperature of the mixture does not exceed 160°C. After a further 20 minutes heating, the product is cooled and ground.

Properties:

| | |
|---|---|
| epoxide group equivalents/kg | = 3.2, |
| softening point | = 85°C, |
| melting point | = 97°C. |

PRODUCTION OF CURING AGENTS

Curing agent A

An amount of 1300 g of 4,4′-diaminodiphenylmethane is placed into a 3-liter reaction vessel and heated to 140°C. In the course of 50 minutes, 1000 g of a liquid bisphenol-A epoxy resin having a content of 5.35 epoxide group equivalents/kg, and a viscosity at 25°C of 13,500 cP, is added dropwise, with continuous stirring, in such a manner that the temperature of the mixture does not exceed 170°C. After a further 30 minutes at 140°C, the product is cooled and ground.

Properties:

| | |
|---|---|
| amino group equivalents/kg | = 4.45, |
| softening point | = 57°C, |
| melting point | = 70°C. |

Curing agent B

An amount of 1000 g of 4,4′-diaminodiphenylmethane is weighed into a 3-liter reaction vessel and heated to 140°C. In the course of 50 minutes, 1000 g of the same resin as used for curing agent A is mixed in, with continuous stirring, so that the temperature of the mixture never exceeds 170°C. After a further 30 minutes at this temperature, the viscous product is cooled and ground.

Properties:

| | |
|---|---|
| amino group equivalents/kg | = 3.65, |
| softening point | = 67°C, |
| melting point | = 80°C. |

Curing agent C 4,4′-Diaminodiphenylmethane (NH$_2$/kg = 10.0) and the same resin as used for curing agent A, both heated to 100°C, are placed, in a weight ratio of 1.2 : 1.0, into a continuously operating reactor heated to 170°C, wherein they are caused to react as continuous stirring with the aid of a helical stirrer proceeds. The product flowing from this plant is cooled and then ground.

Properties:

| | |
|---|---|
| amino group equivalents/kg | = 4.2, |
| softening point | = 63°C, |
| melting point | = 76°C. |

Curing agent D

An amount of 1100 g of 4,4′-diaminodiphenylsulphide (thioaniline) (NH$_2$/kg = 9.2) is heated in a 3-liter reaction vessel to 150°C. In the course of 60 minutes, an amount of 1000 g of the same resin as used for curing agent A is mixed in; after a further 30 minutes at the same temperature, the product is cooled and then ground.

Properties:

| | |
|---|---|
| amino group equivalents/kg | = 3.5, |
| softening point | = 70°C, |
| melting point | = 85°C. |

Curing agent E

An amount of 1000 g of m-phenylenediamine (18.4 NH$_2$/kg) is heated in a 3-liter reaction vessel to 130°C; in the course of 30 minutes and with continuous stirring, 975 g of cyclohexylaminediglycide (7.38 epoxide equiv./kg) is then mixed in in portions. After a further 30 minutes at this temperature, the product is cooled and finally ground.

Properties:

| | |
|---|---|
| amino group equivalents/kg | = 7.38, |
| softening point | = 67°C, |
| melting point | = 82°C. |

Curing agent F

An amount of 1000 g of 4,4′-diaminoditoluylmethane (8.8 NH$_2$/kg) is placed into a 3-liter reaction vessel and heated to 140°C. In the course of 40 minutes, 615 g of diglycidylterephthalate (7.18 epoxide group equiv./kg) is added dropwise. After the whole has been mixed, the mixture is maintained for a further 1 hour at 140°C; the product is then cooled and ground.

Properties:

|  |  |
|---|---|
| amino group equivalents/kg | = 4.08 NH₂/kg, |
| softening point | = 65°C, |
| melting point | = 79°C. |

Curing agent G

An amount of 309 g of 4,4'-diaminodiphenylmethane (NH₂/kg = 10.0) is placed into a 2-liter reaction vessel and heated to 140°C. In the course of 1 hour, an amount of 500 g of a bromine-containing epoxide resin ester based on tetrabromobisphenol A having 3.16 epoxide group equiv./kg and 40 per cent by weight of bromine is added dropwise in the melted state (temperature 100°C) and, with continuous stirring, mixed in, the procedure being such that the temperature does not exceed 155°C. After a further 30 minutes at this temperature, the viscous product is cooled and then ground.

Properties:

|  |  |
|---|---|
| amino group equivalents/kg | = 2.9 NH₂/kg, |
| softening point | = 70°C, |
| melting point | = 85°C. |

PRODUCTION OF MOULDING MATERIALS

Example 1

An amount of 225 g of resin adduct I is ground with 75 g of curing agent A, 300 g of talcum, 380 g of kaolin, 10 g of zinc stearate and 10 g of gas black in a 4.5-liter ball mill for 15 hours. The obtained fine pulverulent moulding material is granulated, tabletted and the tablets, preheated to 80°C, processed in moulding tools at 165°C. The following values are measured on the test specimens:

| | |
|---|---|
| flexural strength (DIN), kp/cm² | 700, |
| impact strength (DIN), cmkp/cm² | 6, |
| dimensional stability under heat according to Martens (°C) | 112 |
| water absorption (DIN), mg | 8 |
| el. insulation resistance, ohm.cm | 10¹⁵ |
| loss factor tan δ/10³ c.p.s. | 0.01 |

Comparison test

The storage stability of the moulding material according to Example 1 is compared with that of a moulding material in the B-condition (B-stage) which is produced as follows: The following constituents are mixed together in a 5-liter divided trough kneader for 30 minutes: 300 g of talcum, 380 g of kaolin, 10 g of zinc stearate and 10 g of gas black. A mixture is then prepared of 65 g of melted 4,4'-diaminodiphenylmethane at 100°C in 235 g of a bisphenol-A epoxide resin (epoxide group equiv./kg 5.35) heated to 50°C; the obtained mixture is fed into the kneader and mixed and kneaded with the pulverulent part for 15 minutes. The obtained viscous dough-like mass is then converted, by heating to 35°C, into the solid B-stage, and subsequently ground.

The comparison is made by the spiral flow method, the values being measured in inches:

| Starting value | Moulding material accord. to Ex. 1 | B-stage |
|---|---|---|
| starting value | 15 | 18 |
| after 24 h storage at 40°C | 13½ | 8 |
| after 24 h storage at 50°C | 9 | ½ |

Example 2

An amount of 250 g of resin adduct II is mixed and ground with 100 g of curing agent B, 10 g of calcium stearate, 10 g of gas black and 630 g of quartz flour in a 4.5-liter ball mill for 7 hours. The obtained moulding material is further processed according to Example 1.

Properties:

| | |
|---|---|
| flexural strength, kp/cm² | 1000, |
| impact strength, cmkp/cm² | 9, |
| dimensional stability according to Martens (DIN) °C | 120, |
| water absorption (DIN), mg | 7, |
| electrical insulation resistance ohm.cm | 2 · 10¹⁵, |
| loss factor tan δ/10³ c.p.s. | 0.008. |

Example 3

An amount of 183 g of resin adduct III is ground with 67 g of curing agent C, 730 g of ground shale, 10 g of titanium oxide and 10 g of zinc stearate in a 4.5-liter ball mill for 10 hours; the fine-pulverulent product is then further processed as in Example 1.

Properties:

| | |
|---|---|
| flexural strength (DIN), kp/cm² | 550, |
| impact strength (DIN), cmkp/cm² | 4.5, |
| dimensional stability under heat according to Martens (DIN), °C | 108, |
| water absorption (DIN), mg | 12, |
| el. insulation resistance, ohm.cm | 10¹⁴, |
| loss factor, tan δ/10³ c.p.s. | 0.03. |

Example 4

An amount of 260 g of resin adduct IV is ground with 110 g of curing agent D, 610 g of ground glass fibres, 10 g of zinc stearate and 10 g of gas black in a 4.5-liter ball mill for 15 hours. The obtained powder is further processed as described in Example 1.

Properties:

| | |
|---|---|
| flexural strength (DIN), kp/cm² | 1200, |
| impact strength (DIN), cmkp/cm² | 12, |
| dimensional stability according to Martens (DIN), °C | 120, |
| water absorption (DIN), mg | 8, |
| el. insulation resistance, ohm.cm | 10¹⁶, |
| loss factor, tan δ/10³ c.p.s. | 0.003. |

Example 5

An amount of 223 g of resin adduct I is ground with 77 g of curing agent C, 695 g of calcined kaolin, 2 g of "OP Wax" and 3 g of gas black in a 4.5-liter ball mill for 15 hours. The obtained pulverulent moulding material is tabletted and further processed as described in Example 1.

Properties:
| | |
|---|---|
| flexural strength (DIN), kp/cm² | 1350, |
| impact strength (DIN), cmkp/cm² | 10, |
| dimensional stability under heat according to Martens (DIN), °C | 125, |
| water absorption (DIN), mg | 7, |
| el. insulation resistance, ohm.cm | 5 · 10¹⁵, |
| loss factor tan δ/50 c.p.s. | 0.006. |

Example 6

An amount of 180 g of resin adduct I is ground with 70 g of curing agent C, 50 g of a high-molecular bisphenol-A epoxide resin (epoxide group equivalents/kg = 1.1), 693 g of calcium silicate (wollastonite), 4 g of "OP Wax" and 3 g of gas black in a 4.5-liter ball mill for 12 hours, and the obtained powder granulated. The further processing is carried out as in Example 1.

Properties:
| | |
|---|---|
| flexural strength (DIN), kp/cm² | 1000, |
| impact strength (DIN), cmkp/cm² | 8, |
| dimensional stability under heat according to Martens (DIN), °C | 123, |
| water absorption (DIN), mg | 9, |
| el. insulation resistance ohm.cm | 8 · 10¹⁴, |
| loss factor tan δ/10³ c.p.s. | 0.015. |

Example 7

An amount of 246 g of resin adduct I is ground with 124 g of curing agent G, 564 g of ground glass fibres, 50 g of antimonous trioxide, 5 g of titanium white (Rutil), 1 g of 'Chromophtalblau' and 10 g of carnauba wax for 13 hours in a 4.5-liter ball mill. Further processing is carried out as in Example 1.

Properties:
| | |
|---|---|
| flexural strength (DIN), kg/cm² | 1000, |
| impact strength (DIN), cmkp/cm² | 10, |
| Martens' value (DIN), °C | 123, |
| water absorption (DIN), mg | 10, |
| el. insulation resistance, ohm.cm | 10¹⁶, |
| loss factor, tan δ/10³ c.p.s. | 0.004. |

Example 8

An amount of 158 g of resin adduct I is ground with 103 g of curing agent C and 79 g of triglycidylisocyanurate/hexahydrophthalic acid preadduct, 5.7 epoxide group equivalents/kg, 300 g of ground glass fibres, 350 g of wollastonite, 7 g of "OP Wax" and 3 g of gas black for 10 hours in a 4.5-liter ball mill, and further processed as in Example 1.

Properties:
| | |
|---|---|
| flexural strength (DIN), kp/cm² | 1100, |
| impact strength (DIN), cmkp/cm² | 9, |
| dimensional stability under heat according to Martens (DIN), °C | 150. |

Example 9

An amount of 196 g of glycidylated cresol novolak (epoxide equiv./kg = 4.65, softening point = 62°C) is mixed and ground with 104 g of curing agent adduct C, 393 g of calcined kaolin, 300 g of glass fibres, 4 g of "OP Wax" and 3 g of gas black in a 4.5-liter ball mill for 8 hours. The pulverulent product is afterwards further processed as in Example 1.

Properties:
| | |
|---|---|
| flexural strength (DIN), kp/cm² | 900, |
| impact strength (DIN), cmkp/cm² | 6, |
| dimensional stability under heat according to Martens (DIN), °C | 175, |
| water absorption (DIN), mg | 8, |
| el. insulation resistance, ohm.cm | 5 · 10¹⁵ |
| loss factor (10³ c.p.s.) | 0.009. |

Example 10

An amount of 186 g of glycidylated phenol nonolak (epoxide equiv./kg = 5.4, softening point = 53°C) is mixed and ground with 114 g of curing agent adduct C, 693 g of calc. kaolin, 4 g of "OP Wax" and 3 g of gas black in a 4.5-liter ball mill for 8 hours. The pulverulent product is afterwards further processed as in Example 1.

Properties:
| | |
|---|---|
| flexural strength (DIN), kp/cm² | 1140, |
| impact strength (DIN), cmkp/cm² | 8, |
| dimensional stability under heat according to Martens (DIN), °C | 205, |
| water absorption (DIN), mg | 5, |
| el. insulation resistance, ohm.cm | 4 · 10¹⁵, |
| loss factor (10³ c.p.s.) | 0.007. |

Example 11

An amount of 207 g of glycidylated phenolphthalein (epoxide equiv./kg = 4.15, softening point = 55°C) is mixed and ground with 95 g of curing agent adduct A, 685 g of quartz flour, 10 g of zinc stearate and 5 g of gas black in a 4.5-liter ball mill for 6 hours. The pulverulent product is then further processed as in Example 1.

Properties:
| | |
|---|---|
| flexural strength (DIN), kp/cm² | 700, |
| impact strength (DIN), cmkp/cm² | 5, |
| dimensional stability under heat according to Martens (DIN), °C | 137, |
| water absorption (DIN), mg | 5, |
| el. insulation resistance, ohm.cm | 3 · 10¹⁵, |
| loss factor (10³ c.p.s.) | 0.02. |

Example 12

An amount of 163 g of diglycidylterephthalate (epoxide equiv./kg = 6.10, softening point = 96°C) is ground and mixed with 137 g of curing agent adduct B, 0.05 g of imidazole, 675 g of calcined kaolin, 10 g of titanium white, 5 g of iron oxide and 10 g of zinc stearate for 15 hours in a 4.5-liter ball mill. The further processing of the product is as described in Example 1.

Properties:
| | |
|---|---|
| flexural strength, kp/cm² | 850, |
| impact strength, cmkp/cm² | 9, |
| dimensional stability under heat according to Martens (DIN), °C | 110, |
| water absorption (DIN), mg | 10, |
| electrical insulation resistance ohm.cm | 2 · 10¹⁵, |

| | |
|---|---|
| loss factor, tan δ, 10³ c.p.s. | 0.014. |

Example 13

An amount of 223 g of resin adduct I is ground with 77 g of curing agent C, 300 g of ground glass fibres, 390 g of kaolin, 2 g of gas black and 1 g of "OP Wax" in a 4.5-liter ball mill for 10 hours. The obtained pulverulent moulding material is granulated to produce a particle size of between 0.2 and 2.0 mm, and the granulate mixed briefly with 0.6 g of "OP-Wax". This product is suitable for processing in the injection moulding process.

Properties:
| | |
|---|---|
| flexural strength (DIN) | 900 kp/cm², |
| impact strength | 9 kpcm/cm², |
| dimensional stability according to Martens (DIN) | 118 °C, |
| water absorption (DIN) | 12 mg |
| electrical insulation resistance | $4 \cdot 10^{14}$ ohm·cm. |
| loss factor, tan δ, (10³ c.p.s.) | 0.025. |

We claim:
1. Storage-stable, one package quick-curing resin moulding materials consisting essentially of:
   a. epoxide resin consisting essentially of an adduct containing free epoxide groups and formed from a low molecular weight epoxide resin and a polyamine,
   b. pre-adducts containing free amino groups and formed from polyamines containing aromatic groups and a diepoxide, as curing agents, wherein the ratio of the number of the reactive hydrogen atoms of the polyamine on the amine nitrogen atoms to that of the epoxide groups of the epoxide is in the range of 3;1 to 5:1, and
   c. mineral or organic pulverulent or fibrous fillers, with the epoxide resins and the curing agents softening between 45° and 120°C, and having a melting point higher by 5° to 30°C than the softening point, and the epoxide resins and curing agents being present in the moulding materials predominantly as discrete particles.
2. Moulding materials according to claim 1 which also contain lubricants.
3. Moulding materials according to claim 1, wherein epoxide resin and curing agent have softening points of between 50° and 90°C.
4. Moulding materials according to claim 1, wherein the epoxide resin is an adduct from a glycidylated bisphenol A and 4,4'-diaminediphenylmethane.
5. Moulding material according to claim 1 containing
   a. 223 parts by weight of a resin adduct with epoxide group equivalents/kg = 3.00, softening point = 58°C and melting point = 72°C, produced from 1000 parts by weight of a liquid bisphenol-A-epoxide resin having a content of 5.35 epoxide group equivalents/kg and a viscosity at 25°C of 13'500 cP, and from 100 parts by weight of 4,4'-diaminodiphenylmethane,
   b. 77 parts by weight of a curing agent adduct with amino group equivalents/kg = 4.2, softening point = 63°C and melting point = 76°C produced from 4,4'-diamino-diphenylmethane and a liquid bisphenol-A-epoxide resin having a content of 5.35 epoxide group equivalents/kg and a viscosity at 25°C of 13'500 cP, in a weight ratio of 1.2:1.0,
   c. 695 parts by weight calcined kaolin,
   d. 2 parts by weight of a partially esterified polymethylene wax, and
   e. 3 parts by weight of gas black.
6. Moulding material according to claim 1 containing
   a. 180 parts by weight of a resin adduct with epoxide group equivalents/kg = 3.00, softening point = 58°C and melting point = 72°C, produced from 1000 parts by weight of a liquid bisphenol-A-epoxide resin having a content of 5.35 epoxide group equivalents/kg and a viscosity at 25°C of 13'500 cP, and from 100 parts by weight of 4,4'-diaminodiphenylmethane,
   b. 70 parts by weight of a curing agent adduct with amino group equivalents/kg = 4.2, softening point = 63°C and melting point = 76°C produced from 4,4'-diamino-diphenylmethane and a liquid bisphenol-A-epoxide resin having a content of 5.35 epoxide group equivalents/kg and a viscosity at 25°C of 13'500 cP, in a weight ratio of 1.2:1.0,
   c. 693 parts by weight of wollastonite,
   d. 4 parts by weight of a partially esterified polymethylene wax, and
   e. 3 parts by weight of gas black.
7. Moulding material according to claim 1 containing
   a. 223 parts by weight of a resin adduct with epoxide group equivalents/kg = 3.00, softening point = 58°C and melting point = 72°C, produced from 1000 parts by weight of a liquid bisphenol-A-epoxide resin having a content of 5.35 epoxide group equivalents/kg and a viscosity at 25°C of 13'500 cP, and from 100 parts by weight of 4,4'-diaminodiphenylmethane,
   b. 77 parts by weight of a curing agent adduct with amino group equivalent/kg = 4.2, softening point = 63°C and melting point = 76°C produced from 4,4'-diamino-diphenylmethane and a liquid bisphenol-A-epoxide resin having a content of 5.35 epoxide group equivalents/kg and a viscosity at 25°C of 13'500 cP, in a weight ratio of 1.2:1.0,
   c. 300 parts by weight of ground glass fibres,
   d. 390 parts by weight of kaolin,
   e. 2 parts by weight of gas black, and
   f. 1 part by weight of a partially esterified polymethylene wax.
8. Process for the production of storage-stable, quick-curing moulding materials, in which process a polyamine containing an aromatic group is reacted with a diepoxide resin, the respective amounts being such that the ratio of the number of the reactive hydrogen atoms of the polyamine on the amine nitrogen atoms to that of the epoxide groups of the epoxide resin is in the range of 3:1 to 5:1; the formed pre-adduct, which has a softening point in the range of 45° to 120°C and a melting point 5° to 30°C higher than this, and which acts as a curing agent for epoxide resins, is then mixed and ground with an epoxide resin softening between 45° and 120°C and having a melting point higher by 5° to 30°C than the softening point, and also with a filler, whereby there occurs to a slight degree at the most a fusing together of the particles of the resin and of the curing agent.
9. Process according to claim 8, wherein lubricants are also employed.

10. Process according to claim 8, wherein the ratio of the number of the reactive hydrogen atoms in the polyamine on the amine nitrogen atoms to the number of the epoxide groups in the epoxide resin is, in the production of the curing agent, between 3.5:1 and 4.5:1.

11. Process according to claim 8, wherein the formation of the curing agent is performed in the absence of solvents and at a temperature of between 50° and 200°C.

12. Process according to claim 8, in which process the curing agent, the lubricant and the filler are mixed with an epoxide resin without regard for the sequence in which the individual constituents of the moulding materials are added and mixed in, the said epoxide resin being an adduct containing free epoxide groups and formed from a low-molecular weight epoxide resin and a polyamine.

13. Process according to claim 12, wherein the epoxide resin employed is an adduct from an epoxidised bisphenol A and 4,4'-diaminodiphenylmethane.

14. Process according to claim 8, wherein curing agents and epoxide resins are employed which have softening points of between 50° and 90°C.

* * * * *